United States Patent [19]

Gewirtz

[11] 4,086,009
[45] Apr. 25, 1978

[54] PHOTOGRAPHIC ENLARGING EQUIPMENT AND METHOD

[75] Inventor: William Gewirtz, New York, N.Y.

[73] Assignee: Gerry Wind Assoc. Color Labs., New York, N.Y.

[21] Appl. No.: 774,449

[22] Filed: Mar. 4, 1977

[51] Int. Cl.² .................... G03B 27/52; G03B 27/32
[52] U.S. Cl. ........................................ 355/30; 355/77
[58] Field of Search ................... 355/21, 27, 30, 63, 355/77, 70, 71

[56] References Cited

U.S. PATENT DOCUMENTS

| 2,014,285 | 9/1935 | Morrall | 355/70 |
| 2,344,558 | 3/1944 | Moore | 355/63 |
| 2,849,915 | 9/1958 | Kennedy | 355/30 |
| 3,025,758 | 3/1962 | McAdam et al. | 355/70 |
| 3,222,985 | 12/1965 | Remesat | 355/37 |
| 3,252,370 | 5/1966 | Luther | 355/71 |

FOREIGN PATENT DOCUMENTS 312,517  5/1929  United Kingdom ................ 355/30

Primary Examiner—Donald A. Griffin
Attorney, Agent, or Firm—Stephen E. Feldman; Marvin Feldman

[57] ABSTRACT

A selectively operable switch, separate and distinct from the conventional on/off switch, is electrically connected into the fan control circuit of a photographic enlarger, for selective operation, as by the foot of the operator, to turn off the fan, and thus eliminate any vibrations caused by same, for certain operations, as when making an internegative; and for turning the fan back on after such operations to provide cooling air to protect the lenses and other components within the enlarger head. Alternatively, the fan and its drive motor are housed at a location removed from the enlarger head with a flexible tube connecting the outflow from the fan to the enlarger head to provide the air for cooling the enlarger lenses and other components housed within the enlarger head.

4 Claims, 3 Drawing Figures

PHOTOGRAPHIC ENLARGING EQUIPMENT AND METHOD

BACKGROUND OF THE INVENTION — FIELD OF APPLICATION

This invention relates to photographic enlargers; and more particularly to a method, and/or equipment, for controlling the vibration of the enlarger head during operation of the enlarger.

BACKGROUND OF THE INVENTION — DESCRIPTION OF PRIOR ART

Conventionally available photographic enlargers, especially for commercial uses where definition and clarity are essential, requires complex and expensive lenses and controls for controlling focusing and the like. The lenses and controls are housed within the enlarger head along with the lamp for illuminating the negative carrier. A considerable amount of heat is given off when the lamp is illuminated; especially during certain enlarging operations requiring long exposures. To protect the lenses, controls and other components housed within the enlarger head from the heat generated by the lamp a fan and attendant motor is also housed within the enlarger head to draw cool air into the enlarger head, and to circulate air about the components that are to be cooled and protected.

Such enlargers, no matter how accurately and delicately manufactured usually vibrate somewhat from the motor driven fan. Vibrations, in turn, result in some movement of the enlarger head; which, while they may be imperceptable to the eye affect the clarity of the enlargers output.

The marketplace has learned to live with unclear prints; but still objects to same, especially for type "C" prints. Type C prints are made from internegatives which are also made on an enlarger. Thus existing systems first produced an unclear type C negative and then utilize same to make an evenless clear type C print.

Some available systems attempt to reduce the vibrations by employing condenser enlargers which produce a sharp negative. But condenser enlargers show up every speck of dirt and dust. As a practical matter there is no practical way of eliminating all dirt and dust from a photographic labratory.

Other systems incorporate dye techniques to reduce surface scratches and thereby the affinity of the negative for dust and dirt; but such techniques are time consuming and expensive.

SUMMARY OF THE INVENTION

It is therefore an object of this invention to provide a new and improved photographic enlarger.

It is another object to provide new and improved fan control for a photographic enlarger.

It is a further object of this invention to proivde new and improved cooling equipment for the components within the head of a photographic enlarger.

It is still another object of this invention to provide a new and improved method for utilizing a photographic enlarger.

It is a still further object of this invention to provide a new and improved method for reducing the vibrations that may may be imparted to the enlarger head and its components by the fan and motor utilized to cool same.

It is yet another object of this invention to provide a new and improved method for utilizing a photographic enlarger for certain operations.

It is yet still another object of this invention to provide a new and improved method for utilizing a photographic enlarger for making internegatives.

It is yet still a further object of this invention to provide a new and improved method for utilizing a photographic enlarger for making "C" type prints.

This invention involves photographic enlargers and the method of utilizing and/or manufacturing same to minimize, if not eliminate, vibrations from the fan and motor, incorporated to cool the components housed in the enlarger head; and thus the affect of such vibrations upon internegatives and prints made with the enlarger. It contemplates selectively controlling the fan motor circuit to shut down the motor and fan during selected periods when vibrations could be detrimental; and/or the isolation of the fan motor and fan from the enlarger head and transmission of the cooling air from the isolated fan to the enlarger head by means which do not transmit the vibrations of the fan and its motor to the enlarger head.

Other objects, features, and advantages of the invention in its details of construction and arrangement of parts will be seen from the above, from the following description of the preferred embodiment when considered with the drawings and from the appended claims.

DESCRIPTION OF THE PREFERRED EMBODIMENTS

For convenience the invention will be described as applied to an otherwise conventional photographic enlarger incorporating a negative carrier, lenses, illuminating means and attendant controls housed within the enlarger head. When the motor driven fan is also housed within the enlarger head a foot operated switch is electrically connected into the fan motor circuit to be operated to control the motor and its fan. In the alternative the motor and fan are separately housed and secured to a wall somewhat near the enlarger with the output from the fan transmitted to the enlarger head by flexible hose. It should be understood, nevertheless, that without departing from the scope of this invention that a hand or otherwise selectively operable switch may be interconnected into the fan motor circuit when the fan and motor are housed within the enlarger head; and that the separately housed fan and motor may be merely placed upon a table, set upon the floor, mounted upon a stand or otherwise positioned so that vibrations therefrom are not imparted to the enlarger.

Figure 1:
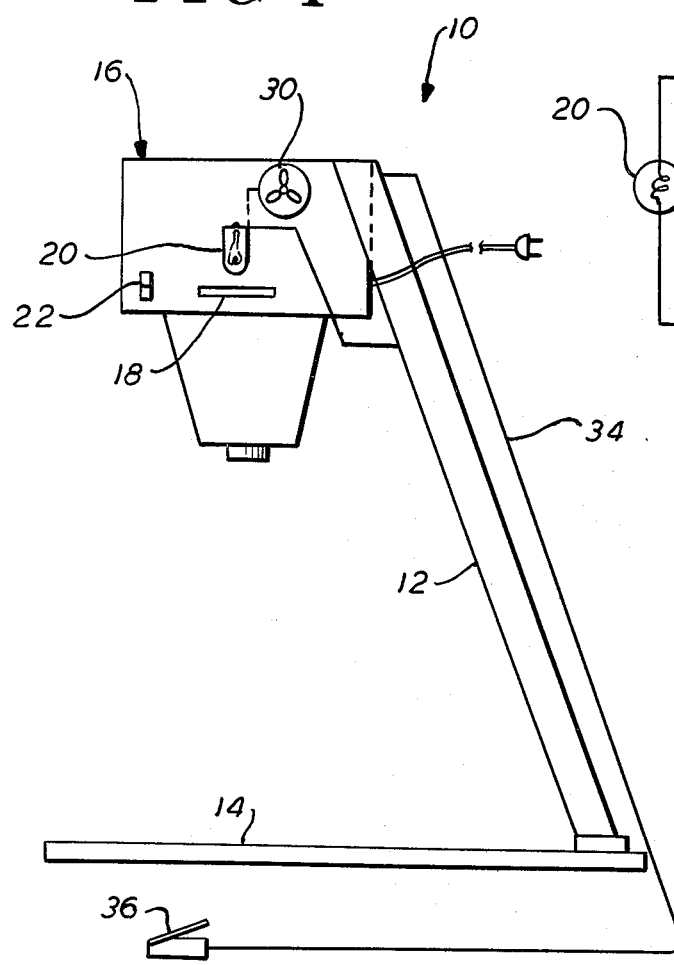
FIG. 1 is a side elevational schematic view of a photographic enlarger incorporating the instant invention.

With reference to FIG. 1 there is generally shown at 10 a photographic enlarger of conventional construction and such as one might employ for making internegatives.

Figure 2:
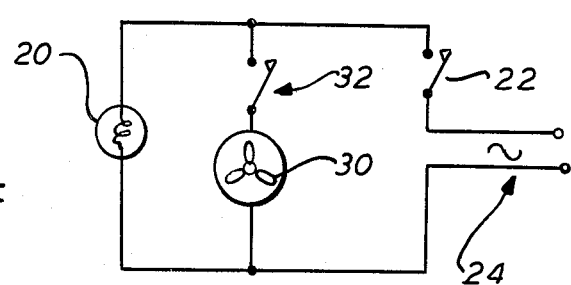
FIG. 2 is a schematic circuit diagram for controlling the circuit to the fan motor of the photographic enlarger of FIG. 1.

A stand 12 interconnects a base 14 to an enlarger head 16, within which is housed a negative carrier 18 and a lamp 20 for illuminating carrier 18 and any negative (not shown) which may be housed therewithin. Lamp 20 is (FIGS. 1 and 2) suitably interconnected into an electrical circuit through an on/off switch 22 and an electrical conductor 24 provided with a plug 26 for connection into the outlet (not shown) for a source of suitable electrical power. Also electrically interconnected into said electrical circuit (FIG. 2) is a fan and motor 30 of conventional construction.

An alternative circuit 32 is provided for fan motor 30 through an electrical conductor 34 and a foot operated switch 36.

In using photographic enlarger 10, as one might do to make an internegative, the operator connects plug 26 to a source of suitable electrical power and turns on/off switch 22 to its on position. Assuming foot switch 36 has been operated to close switch 32 fan motor 30 and its fan will operate to provide cooling air to the components within enlarger head 16; including appropriate lens (not shown) which are disposed proximate carrier 18. When enlarger 10 is otherwise set up to make an internegative, and it is desired to eliminate the affect of vibrations from fan motor 30 and its fan upon the internegative, the operator steps on foot switch 36 to open contacts 32 and turn off fan motor 30. After the relatively short time for making the internegative has passed the operator again steps on foot switch 36 closing the circuit 32 and turning motor 30 and its fan on again.

Figure 3:
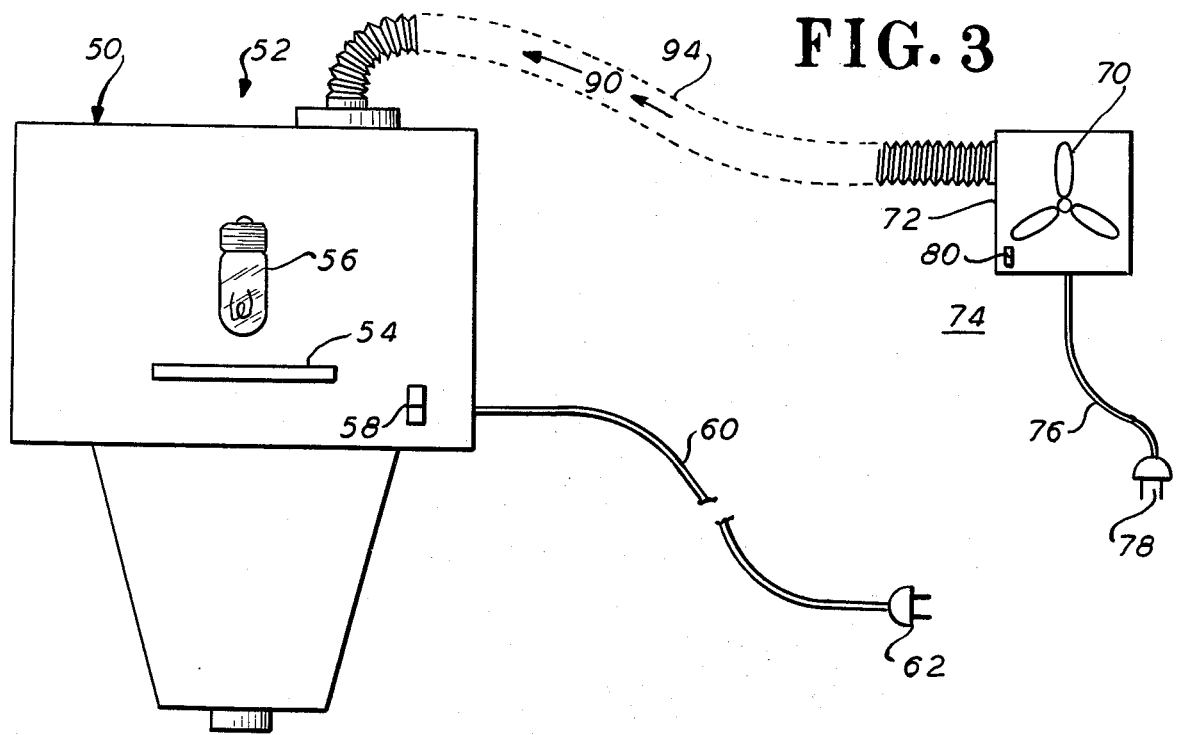
FIG. 3 is a side elevational schematic view of a photographic enlarger showing an alternative embodiment of the instant invention.

With reference to FIG. 3 there is generally shown at 50 an enlarger head for a photographic enlarger 52 of the type one might employ for making a C type negative. Enlarger head 50 is adapted to be supported by a base (not shown) and stand (not shown) such as one shown for photographic enlarger 10 in FIG. 1.

Suitable lenses (not shown) are housed within enlarger head 50 proximate a negative carrier 54 and an illuminating lamp 56. Appropriate electrical conductors interconnect lamp 56 through an on/off switch 58 to a power cord 60 terminating in a plug 62 suitable to interconnect enlarger head 50 to a source of appropriate electrical power.

Cooling of the components within enlarger head 50 is accomplished by the flow of air generated by a fan and motor combination 70 housed within a support housing 72 suitably connected to a wall 74 proximate enlarger 52. Fan and motor combination 70 is appropriately connected to a source of suitable electrical power by a power cord 76 and plug 78 through an on/off switch 80.

The stream of air 90 generated when fan motor combination 70 is on is directed through a suitable length of flexible hose 94 into a opening (not shown) formed in enlarger head 50. Appropriate connecting means are provided for connecting hose 94 to fan motor housing 72 and enlarger head 50. By using flexible hose 94 any vibrations generated by fan motor combination 70 are despatched within hose 94 and thus isolated from enlarger head 50.

From the above description it will thus be seen that there has been provided a method and/or construction for a photographic enlarger which minimizes, if not fully eliminates the affect of vibrations from the cooling fan and motor upon photographic enlarging processes, especially the processes for making internegatives and type "C" prints; which method and/or construction is relatively simple and inexpensive and requires only minimal modification of the photographic enlarger.

It is understood that although I have shown the preferred forms of my invention that various modifications may be made in the details thereof without departing from the spirit as comprehended by the following claims.

I claim:
1. A photographic enlarger comprising:
    (a) an enlarger head;
    (b) illuminating means disposed within said enlarger head;
    (c) enlarging component means supported by said enlarging head at least some of which are proximate said illuminating means;
    (d) fan means for generating a flow of air into said enlarger head for cooling the interior of same and;
    (e) means for supporting said fan means, wherein said means for supporting said fan means supports said fan means removed from said enlarger head;
    (f) circuit means for providing suitable power to said illuminating means and said fan means to operate same; and
    (g) control means associated with said fan means and enlarger head to reduce the effect of vibrations from said fan means upon said enlarger head, the elements housed therewithin and photographic items made thereby, wherein said control means include flexible hose means for interconnecting said fan means to said enlarger head and wherein said control means includes selectively operable switch means electrically interconnected to said fan means to selectively control operation thereof and operable to shut off said fan means, said switch means being spaced from said enlarger head and thereby eliminate vibrations therefrom and the effect of such vibrations upon said enlarger head.
2. The enlarger of claim 1, wherein said selectively operable switch is a foot switch selectively operable by the foot of the user.
3. The enlarger of claim 1, including stand and base means associated with said enlarger head for positioning said enlarger head.
4. A method for utilizing a photographic enlarger so as to minimize, if not completely eliminate, vibrations to the enlarger head and its components during at least certain operations thereof comprising:
    (a) providing means for generating and directing a flow of air for and to the components of an enlarger housed within the enlarger head; and
    (b) providing control for said generating and directing means to isolate vibrations which may be generated thereby from said enlarger head, wherein said control is provided by providing flexible conduit means for conducting the flow of air from said means for generating and directing a flow of air to said enlarger head.

* * * * *